United States Patent
Huffer

(10) Patent No.: US 7,244,496 B2
(45) Date of Patent: Jul. 17, 2007

(54) TAMPER EVIDENT FLOW WRAP

(75) Inventor: Scott W. Huffer, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 10/880,926

(22) Filed: Jun. 30, 2004

(65) Prior Publication Data

US 2005/0003155 A1    Jan. 6, 2005

(51) Int. Cl.
*B32B 7/12* (2006.01)
*B65D 65/40* (2006.01)
*B65D 33/34* (2006.01)

(52) U.S. Cl. .............. 428/354; 428/916; 428/915; 428/343; 428/913

(58) Field of Classification Search .......... 428/916, 428/915, 343, 354, 913
See application file for complete search history.

(56) References Cited

U.S. PATENT DOCUMENTS

| | | | |
|---|---|---|---|
| 3,802,947 A | 4/1974 | McQuade, Jr. |
| 4,008,115 A | 2/1977 | Fairbanks et al. |
| 4,119,479 A | 10/1978 | Williams, Jr. et al. |
| 4,121,003 A | 10/1978 | Williams |
| 4,184,701 A | 1/1980 | Franklin et al. |
| 4,224,379 A | 9/1980 | Ichinose et al. |
| 4,510,621 A | 4/1985 | Sak et al. |
| 4,566,927 A | 1/1986 | Wood |
| 4,709,396 A | 11/1987 | Voshall et al. |
| 4,709,397 A | 11/1987 | Voshall et al. |
| 4,876,123 A | 10/1989 | Rivera et al. |
| 4,931,327 A | 6/1990 | Liu et al. |
| 5,017,417 A | 5/1991 | Miyazawa et al. |
| 5,028,290 A | 7/1991 | Curiel |
| 5,153,042 A | 10/1992 | Indrelie |
| 5,295,470 A | 3/1994 | Straubel |
| 5,405,692 A | 4/1995 | Weng et al. |
| 5,500,265 A | 3/1996 | Ambroise et al. |
| 5,631,068 A | 5/1997 | Smith |
| 5,633,058 A | 5/1997 | Hoffer et al. |
| 5,683,774 A | 11/1997 | Faykish et al. |
| 5,770,283 A | 6/1998 | Gosselin et al. |
| 5,888,649 A | 3/1999 | Curatolo et al. |
| 6,033,762 A | 3/2000 | Decker |
| 6,096,387 A | 8/2000 | Decker |

(Continued)

FOREIGN PATENT DOCUMENTS

EP    0 403 161 A    12/1990
EP    1 231 052 A2 *  8/2002

Primary Examiner—Daniel Zirker
(74) Attorney, Agent, or Firm—DLA Piper US LLP

(57) ABSTRACT

A tamper evident packaging material is described. The material is formed from a substrate having a weak skin layer and at least one additional layer. A pressure sensitive adhesive is applied to the weak skin layer. An electron beam cured coating having a non-migratory slip agent is disposed on the surface of the substrate opposite the weak skin layer. The weak skin layer has a lower Z tear strength than the affinity that the pressure sensitive adhesive has for itself and for the weak skin layer, such that at least part of the weak skin layer separates from the at least one additional layer when the pressure sensitive adhesive is sealed against the weak skin layer of a second substrate and the two substrates are subsequently pulled apart.

5 Claims, 1 Drawing Sheet

U.S. PATENT DOCUMENTS

Figure 1:
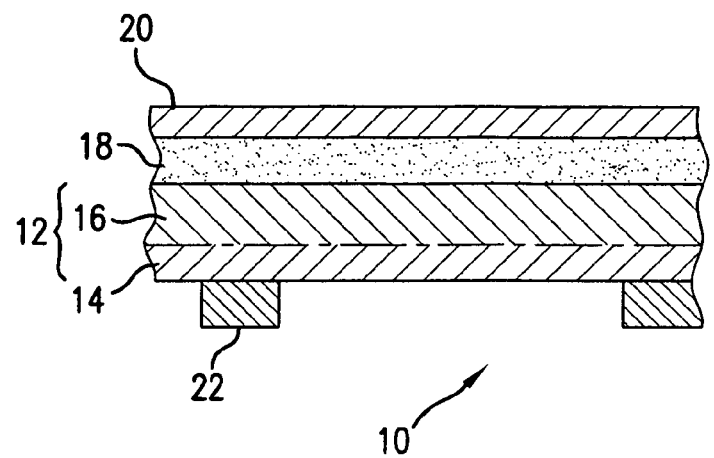

| | | |
|---|---|---|
| 6,349,828 B1 | 2/2002 | Sessions et al. |
| 6,372,341 B1 | 4/2002 | Jung et al. |
| 6,395,376 B1 | 5/2002 | Cooley |
| 6,416,857 B1 | 7/2002 | Wright et al. |
| 6,436,499 B1 | 8/2002 | Krampe et al. |
| 6,503,620 B1 | 1/2003 | Xie et al. |
| 6,544,615 B2 | 4/2003 | Otten et al. |
| 6,569,515 B2 | 5/2003 | Hebrink et al. |
| 2002/0098348 A1 | 7/2002 | McReynolds et al. |
| 2004/0007319 A1 | 1/2004 | Squier et al. |
| 2005/0003155 A1* | 1/2005 | Huffer ................. 428/141 |

* cited by examiner

TAMPER EVIDENT FLOW WRAP

FIELD OF THE INVENTION

The invention relates to a tamper evident packaging material, especially to one suitable for packaging candy bars and other confectionery.

BACKGROUND OF THE INVENTION

Cold sealable materials are known for packaging products that would be adversely affected by exposure to heat, such as might occur during heat sealing of a package, after the product has been placed therein. Candy bars with an external chocolate coating are an example of such a product.

Previously used cold seal packaging materials typically use one of two structures. One structure includes a layer of white oriented polypropylene ("OPP") material, with ink printing on the outside, covered by a layer of lacquer, and a rubber latex cold seal coating on the inside. Another structure comprises a laminate of a white OPP ply and a clear OPP ply, bonded together by an adhesive, with a rubber latex cold seal coating on the exposed, inside, face of the white OPP ply. The clear OPP ply is reverse printed. Both of these structures present a number of problems. With the laminated structure, when the material is stored in rolls, the cold seal coating lies against the clear OPP outer ply, and it is difficult to prevent the cold seal coating from offsetting onto the outer ply when the material is unrolled. Special measures can be taken when applying the coating to ensure that the coating bonds securely to the white OPP ply, so that it will remain attached to that ply and not offset onto the outer ply. However, such measures increase the cost and complication of manufacture. The lacquer in the single-ply structure can be formulated to act as a release layer, but previously used lacquers often contain mobile additives. Such additives may poison the cold seal coating while the packaging material is stored in rolls and the cold seal coating is in contact with the lacquer, or may migrate through the packaging and contaminate the contents in use. Such lacquers are also not very stable, and have a limited life, because of the loss of volatile or migratory components.

Another problem with known cold seal packaging materials is associated with the cold seal itself. The package is sealed by aligning and contacting cold seal cohesive materials, which have been pattern applied to opposing surfaces of the package. Unfortunately, when a user pulls the opposing surfaces apart to open the package, the seal can fail at the interface between the two cohesive materials. The failure between the two cohesive materials leaves the cohesive substantially in tact on both of the opposed surfaces. This leaves open the possibility of a tamperer opening the package, tampering with the contents disposed therein, and then re-contacting the intact cohesive materials to again seal the package. Such tampering may be very difficult, if not impossible, for an unwary consumer to detect.

SUMMARY OF THE INVENTION

The present invention relates to a packaging material, and a method of making such a material. A substrate is formed from at least one sheet of coextruded resinous material. The coextruded sheet includes a weak outer skin layer, which will form the inside of the eventual package, and one or more additional layers. The interface between the weak skin layer and the additional layer exhibits a weak Z tear strength. An electron beam-curable coating is applied to the side of the substrate that will be the outside of the eventual package, opposite the weak skin layer. The coating is cured by exposing it to a suitable electron beam source. A pressure sensitive adhesive ("PSA") is applied to the weak skin layer of the coextruded sheet.

The substrate may be printed with ink and the ink covered and protected by the electron beam-cured coating. This structure replaces a laminated structure that incorporates a clear outer ply which is reverse printed or which covers surface printing on the next ply.

When a package is formed from the packaging material, the sheet is folded upon itself or two sheets are juxtaposed such that the weak skin layers become the inside of the package. At least one of the opposed skin layers has the PSA coated thereon. Pressing together the edges of the opposed weak skin layers, with PSA therebetween, seals the package. When the package is subsequently opened, the weak skin layer of one of the sheets, or the interface between the weak skin layer and the additional layer, fails. Thus, at least a portion of the weak skin layer of the failing sheet will remain affixed to the PSA, thereby poisoning the PSA and making resealing of the package difficult and easier to detect.

BRIEF DESCRIPTION ON THE DRAWINGS

For the purpose of illustrating the invention, there is shown in the drawings a form which is presently preferred; it being understood, that this invention is not limited to the precise arrangements and instrumentalities shown.

FIG. 1 schematically shows a cross section of packaging material according to the present invention.

Figure 2:
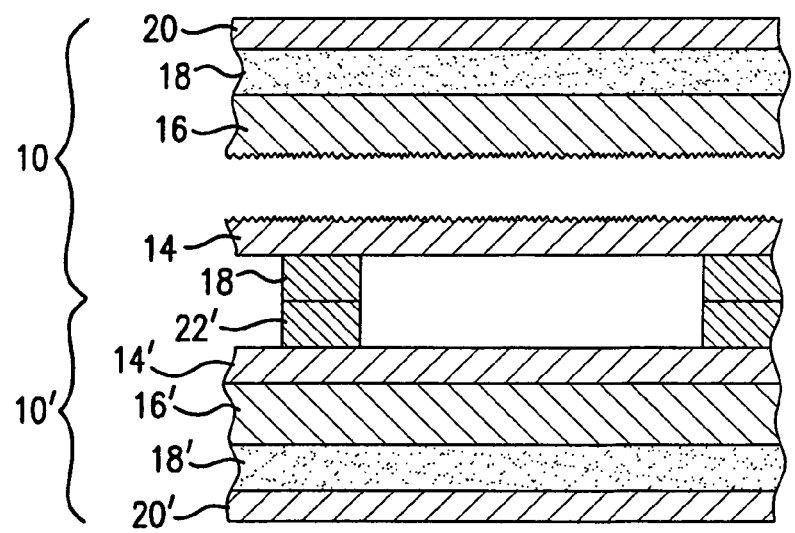

FIG. 2 schematically shows a cross-section of the packaging material of FIG. 1 after it has been folded upon itself, sealed, and subsequently opened.

DETAILED DESCRIPTION OF THE DRAWINGS

Referring now to the drawings, wherein like reference numerals illustrate like elements, FIG. 1 shows a preferred embodiment of the packaging material according to the present invention. The material is shown schematically in cross section and indicated generally by the reference numeral 10. The packaging material 10 includes a substrate 12, which is a coextruded sheet of a weak skin layer 14 and at least one additional layer 16.

The additional layer 16 can be a single layer or can be a plurality of layers. Thus, as used herein, the singular term "additional layer" should be understood to include a plurality of layers. The additional layer can be any of a large number of resinous materials known to those skilled in the art or combinations thereof. Potentially suitable materials include homo- and co-polymers of propylene, ethylene, butene, and other olefins, and blends thereof. Other suitable polymers include, but are not limited to, halogenated polyolefins, polyesters, polyethers, and polyamides. The additional layer 16 can also include foil or metallized film to enhance gas barrier properties. Oxygen scavenging materials can also be included. The additional layer can be oriented in the machine or cross directions or biaxially oriented. The selection of the specific material of the additional layer will ultimately depend on the properties required of the material, which are dictated by the intended end use thereof. In the preferred embodiment, in which the packaging material is intended for use as packaging for candy bars or other confectionery, the additional layer 16 is OPP.

The weak skin layer 14 can be any material that exhibits poor Z tear strength. As used herein, "Z tear strength" is the ability of the material to resist failure or tearing in the Z direction. The failure can occur at the interface of the weak skin layer 14 and the additional layer 16 or the failure can occur internally within the weak skin layer 14. The Z direction is the thickness of the film, i.e., the direction normal to the major surfaces of the film. Materials that exhibit Z tear strength of about 300 g/inch are presently believed to be suitable. However, Z tear strengths ranging from 100 to 500 g/inch may also be suitable, depending on the affinity of other layers in the material 10, as is more fully described below.

Materials for the weak skin layer 14 that exhibit poor Z tear strength include cavitated materials and resins that are incompatible with the resin of the additional layer. For example, if the additional layer 16 is OPP, the incompatible layer can be polyethylene. In that case, the interface of the polyethylene and OPP will have low adhesion and the polyethylene will exhibit the desired poor Z tear strength.

If a cavitated material, such as cavitated OPP, is used as the weak skin layer 14, the failure can occur at the interface between the weak skin layer 14 and additional layer 16, or the failure can occur internally to the cavitated material. Cavitation is a known method of producing opaque (white) OPP films. Methods of coextruding a film structure with a cavitated layer are also known to those skilled in the art. One such method is described in U.S. Pat. No. 4,377,616 to Ashcraft et al., which is incorporated herein by reference. Ashcraft describes a method of making a thermoplastic polymer matrix core layer having a strata of voids. The voids are formed using spherical void-initiating particles, which are phase distinct and incompatible with the matrix material. The voids are formed during stretching of the extruded film.

Ink 18 can be printed on the outside surface of the additional layer 16 (the surface opposite the weak skin layer). The ink can be applied in discrete areas, allowing the white color of the OPP of the preferred embodiment to be seen as a background. The ink 18 can instead be applied in a continuous layer. The ink may be a conventional ink suitable for printing on the additional layer 16 and may be applied by printing processes known for the purpose. The ink 18 printing machine and the package forming and cutting machine may separately be kept in register with the printing. Methods of, and apparatus for, keeping subsequent machines in register with a printed pattern are well known in the art and, in the interests of conciseness, will not be described here.

The outside of the additional layer 16 is covered, over the printing 18, with a layer of electron beam ("EB") curable coating 20, which will be described in more detail below. The EB curable coating 20 is cured immediately after being applied. It forms a protective layer, preventing the printing from becoming smudged or abraded in handling, and also serves as a release layer for PSA. As described below, the excellent release properties exhibited by the EB cured coating allow the use of a relatively aggressive PSA, rather than a less aggressive adhesive or cold seal cohesive.

The EB curable coating can be applied, after the ink 18 has been dried, by passing the film through an EB curable coating application station, where the EB curable coating is coated onto the outside of the additional layer 16, thereby sandwiching the ink layer between the EB curable coating 20 and the additional layer 16. Most any conventional coating unit, such as flexo or gravure units, may be used to apply the EB curable coating. The EB curable coating is preferably a combination of oligomers, monomers, functional slip agents and other processing additives. The preferred oligomer is an epoxy acrylate. The preferred monomer is an acrylate. The monomers act as diluents, used to reduce the viscosity of the coating for application purposes. The concentration of monomer is adjustable to provide a wide range of viscosity, such that many conventional coating systems may be employed to apply the EB curable coating. The blend ratio of oligomer and monomer also controls physical properties and adhesion of the coating.

The slip agents in the coating, which improve the coefficient of friction, include a functional group having a double bond, which will break under an ionizing beam of accelerated electrons and react with the oligomer to become fixed or "reacted-in" during cross-linking of the EB curable coating. Such functional groups are preferably alkenes, such as acrylates. However, other known functional groups may also be suitable. The exact chemical structure of the slip additives will depend largely on the oligomer component of the coating. Given the disclosure of the present application, suitable coatings having slip agents with such a functional group can be formulated by those skilled in the art of EB curable coatings. The critical requirement of the functional group is that it contains a carbon double bond, which will allow the slip agents to chemically react into the oligomer/monomer network and become fixed in the cross-linking process. Thus, the slip agents are not susceptible to the problems associated with slip agent migration.

Various additional additives, the exact nature of which will depend on the specifications of the package to be produced, may also be included in the EB curable coating formulation. It is known to provide additives, such as defoamers and wetting agents to polymer films to improve, for example, gloss and processing qualities. However, unlike the additives used in conventional coatings, the additional additives of the present invention can also include functional groups so as to react into the oligomer/monomer network during EB curing. The stability of the electron beam curable coating and its additives allows for excellent control of the gloss and slip qualities of the packaging material 10, allowing a manufacturer to create packaging according to demanding specifications.

An EB curable coating formulation, which is presently contemplated as being suitable for use in the present invention is sold by Sovereign Chemical and identified by the formulation number EB 1012 F. The EB 1012 F. coating, when applied to substrates at a coat weight of two pounds per ream and cured using the method described below, has excellent properties. The gloss of the coating, as measured by a BYK-Gardner gloss meter at a setting of 60 degrees, has been consistently measured at 75 or more gloss units. The coefficient of friction of the coating, as measured against itself, has been measured at 0.18. In addition, the coating exhibits excellent release characteristics, which are more fully explained below.

Once the EB curable coating has been applied, it is cured using a suitable electron beam source to provide the EB cured coating 20. Suitable electron beam sources include apparatus that can be obtained commercially from Energy Science, Inc. of Wilmington, Mass. Such an apparatus is described in U.S. Pat. No. 6,426,507 to Rangwalla et al., which is incorporated herein by reference.

The amount of energy absorbed during the curing process, also known as the dose, is measured in units of MegaRads ("MRads") or kiloGrays ("kGy"), where one MRad is 10 kGy, one kGy being equal to 1,000 Joules per kilogram. The electron energy output should be within the range of 90 keV to 150 keV for a dosage of 2.0 to 4.0 MRads. Preferably, the energy is within the range of 115 keV to 125 keV for a dosage of 2.5 to 3.5 MRads, and most preferably 124 keV for a dosage of 3.0 MRads.

When exposed to an electron beam from a suitable source, monomer reacts with the oligomer chains to form crosslinks. As already noted, the slip agent in the coating also react with and bond to the chains. The precursor molecules are excited directly by the ionizing electron beam. Therefore no photoinitiator compounds are required, so no residual volatile organic compounds are present in the finished product. Moreover, curing is substantially instantaneous and provides a cure percentage at or near one hundred percent.

It has been found that an electron beam curable coating can be processed at manufacturing speeds in excess of 1000 feet per minute. Such processing speeds are a great improvement over typical lamination speeds which are about 600 feet per minute.

Once the coating has been cured at the EB source, the web 10 passes to a PSA application station, where PSA 22 is applied to the weak skin layer 14. When the packaging material is to be used for food packaging, the adhesive must be food safe. Acrylic food grade PSAs can be suitable. Such food grade adhesives are commercially available from Bostik Findley, Inc. of Wauwatosa, Wis. Presently, it is believed that the PSA should be selected to have a cling value of less than about 100 g/inch with regard to the EB cured layer 20. The affinity of the PSA to both itself and to the weak skin layer 14 is preferably greater than about 500 g/inch.

Various flow aids and additives, such as anti-blocking agents, can be added to the PSA to reduce surface tack. Reduced surface tack will minimize the chances of the adhesive sticking to idlers or filling equipment prior to the packaging material being sealed. The chances of the PSA sticking to such surfaces can be further reduced by minimizing the number of idlers through which the film must run after the PSA is applied, and by taping any necessary idlers with TEFLON tape.

The PSA 22 may be a continuous layer, but preferably, as shown in the Figures, it is pattern applied at only those places where a seal is to be formed. That entails maintaining register between the back side with the PSA and the front side with the printing. Preferably, the adhesive coating machine is a flexographic or rotogravure printing machine forming part of the same production line as, and is mechanically synchronized with, the printing press for the ink. Flexographic and rotogravure printing machines are well known in the art and, in the interests of conciseness, will not be described here. The package forming and cutting machine can then be kept in register with the adhesive pattern in exactly the same way as it is kept in register with the ink printing on the other side of the material. Pattern applying the adhesive 22 has the advantages that far less adhesive is used, and that the adhesive 22 does not contact the contents of the package, or does so only along very narrow areas at the seams. Pattern applying the adhesive can be necessary for some uses, especially food uses, where more than minimal contact between the contents of the package and the adhesive will not be acceptable.

As noted above, the PSA should have a greater affinity for the weak skin layer 14 than it has for the EB cured coating 20. In addition, the Z tear strength of the weak skin layer 14—although intentionally made weak—must be greater than the affinity of the PSA to the EB cured coating. Thus, the PSA 22 will remain affixed to the weak skin layer 14 and the weak skin layer 14 will not fail once the PSA 22 contacts and releases from the EB cured coating 20 when the material 10 is wound in a roll and subsequently unwound (described below). If the selected PSA does not have greater affinity for the weak skin layer 14 than the EB cured coating 20, then a tie layer could be used in between the PSA 22 and the weak skin layer 16. Once the PSA 22 has been pattern applied, the web is run through a dryer in order to cure the adhesive and drive off any volatile solvents.

The material 10 can be wound into a take up-roll (or several take-up rolls if the material is to be slit first), in which the PSA 22 contacts the EB cured coating 20 of the adjacent roll layer. Due to the pressure of roll-winding, the PSA 22 and EB cured coating 20 can be held together tightly while in the roll. However, the PSA 22 will not block due to the release properties of the EB cured coating 20. As described above, the slip agents in the EB cured coating 20 are reacted into the cross-linked oligomer/monomer network of the coating and are, therefore, non-migratory. Thus, the slip agents do not bloom out of the coating or adversely affect the adhesion of the PSA 22 to the weak skin layer 14.

Due to the non-blocking nature of the PSA 22, the material can be stored and shipped in the roll. At a packager's facility, the roll can be unwound and the material 10 processed through form, fill and seal equipment. The package can be sealed by aligning the pattern applied PSA on a first side of the package being produced with that of a second side, and contacting the PSAs on the opposed surfaces to form a PSA to PSA seal. Alternatively, if only one side of the package being produced has had PSA applied thereto, the PSA 22 of that side can directly contact the weak skin layer 14 of the second side to form a weak skin layer to PSA to weak skin layer seal.

In one such method, a sheet of the material 10 can be wrapped round the contents, and its side edges can be turned up to form flanges, which are joined and sealed together with their inside surfaces face-to-face by the PSA seal, to form a generally tubular shape. The ends of the tube can be flattened, and joined and sealed together by PSA seals. A storage space, containing the contents, is thus defined by the area within the sheet and within the seals. The storage space is sealed off from the surrounding environment.

If the contents are a solid object such as a candy bar, the package may be formed round the contents, substantially in the order in which it has been described. If the contents are loose objects such as small pieces of candy, then the package may be formed into a bag, by sealing the longitudinal seal and one end seal, filled, and then closed by sealing the other end seal. In either case, the material 10 for the sheet may be provided in the form of a long strip, with the flanges formed by the side edges of the sheet, and may be cut into lengths immediately before, or after, the end seals are formed. Machines for forming and sealing such packages are available commercially, and the process will not be further described here.

FIG. 2 shows the material 10 folded against itself to form a package. The folded portion of the material is identified in FIG. 2 using the reference numeral 10' to differentiate it from the unfolded portion 10. Of course, the folded portion 10' has the same layers as that of unfolded portion 10, namely a coextruded substrate of weak skin layer 14' and additional layer 16', ink 18', EB cured layer 20' and PSA 22'. The seal in the package was formed between PSA 22 of the material 10 and PSA 22' of the folded portion 10'. Because the weak skin layer 14 has a lower Z tear strength than the affinity that the PSA 22 has for itself (PSA 22'), at least part of the weak skin layer 14 separates from the additional layer 16 when a user pulls the two portions 10 and 10' apart to open the package. The failure occurs at the interface of the weak skin layer 14 and the additional layer 16 or internally within the weak skin layer 14. Of course, the failure could instead occur at the interface of the weak skin layer 14' and the additional layer 16', or internally within the weak skin layer 14'. The failure mode poisons the PSA 22 (or 22'), making it very difficult, if not impossible for a tamperer to reseal the package after it has been opened.

It is also possible that the folded portion 10' could be replaced with a distinct web. In addition, the folded portion 10' can be produced without the PSA 22'. In that case, the PSA 22 would be adhered directly to the weak skin layer 14' of the folded portion. In either event, the failure mode is similar to that described above.

A variety of modifications to the embodiments described will be apparent to those skilled in the art from the disclosure provided herein. Thus, the present invention may be embodied in other specific forms without departing from the spirit or essential attributes thereof and, accordingly, reference should be made to the appended claims, rather than to the foregoing specification, as indicating the scope of the invention.

What is claimed is:

1. A tamper evident packaging material comprising:
   a substrate comprising a weak skin layer and at least one additional layer;
   a pressure sensitive adhesive disposed on the weak skin layer;
   an electron beam cured coating on the surface of the substrate opposite the weak skin layer, the electron beam cured coating comprising a non-migratory slip agent;
   the weak skin layer having a lower Z tear strength than a Z tear strength of the pressure sensitive adhesive; the Z tear strength of the weak skin layer further being lower than an affinity that the pressure sensitive adhesive has for the weak skin layer, such that at least part of the weak skin layer separates from the at least one additional layer when the pressure sensitive adhesive is sealed against the weak skin layer of a second substrate and the two substrates are subsequently pulled apart.

2. The tamper evident packaging material of claim 1, wherein the weak skin layer is cavitated.

3. The tamper evident packaging material of claim 1 wherein the weak skin layer is a resin that is incompatible with the resin of the at least one additional layer.

4. The tamper evident packaging material of claim 3 wherein the weak skin layer is polyethylene and at least one additional layer is oriented polypropylene.

5. The tamper evident packaging material of claim 1 further comprising ink disposed between the electron beam cured coating and the surface of the substrate opposite the weak skin layer.

* * * * *